United States Patent [19]

Puppala

[11] Patent Number: 4,615,232

[45] Date of Patent: Oct. 7, 1986

[54] CONTROL LINKAGE

[75] Inventor: Janaki R. Puppala, Bettendorf, Iowa

[73] Assignee: J. I. Case Company, Racine, Wis.

[21] Appl. No.: 454,694

[22] Filed: Dec. 30, 1982

[51] Int. Cl.[4] ........................ B60K 20/00; B60K 20/02

[52] U.S. Cl. .................................... 74/473 R; 74/491; 251/279

[58] Field of Search ........................ 251/279, 280, 293; 74/474, 479, 473 R, 491

[56] References Cited

U.S. PATENT DOCUMENTS

| | | | |
|---|---|---|---|
| 3,522,744 | 8/1970 | Johnson | 74/473 |
| 3,795,157 | 3/1974 | Campbell et al. | 74/473 R |
| 4,156,474 | 5/1979 | Aida | 180/77 TC X |
| 4,216,680 | 1/1980 | Hayashi et al. | 74/473 R |
| 4,346,618 | 8/1982 | Sakamoto et al. | 74/491 |

FOREIGN PATENT DOCUMENTS

| | | | |
|---|---|---|---|
| 1497770 | 1/1978 | United Kingdom | 74/474 |

*Primary Examiner*—Kenneth J. Dorner
*Assistant Examiner*—Shirish Desai
*Attorney, Agent, or Firm*—Dressler, Goldsmith, Shore, Sutker & Milnamow, Ltd.

[57] ABSTRACT

An improved control linkage assembly is disclosed which is particularly suited for embodiment in association with a material handling implement having a reversibly operable mechanism. The assembly includes an operating lever movable from a neutral position in one of two operating directions eminating from a common neutral position and extending in generally the same direction away from the neutral position. The operating lever is selectively engageable with one of two engaging levers for selectively moving a control element of a control member, such as a hydraulic valve, in one of two opposite directions. This type of movement is effected by a series of mechanical linkages which rotate an intermediate shaft clockwise and counterclockwise facilitating movement of the control element in first and second directions.

6 Claims, 6 Drawing Figures

CONTROL LINKAGE

FIELD OF INVENTION

This invention relates generally to control linkage assemblies and more specifically to an operating linkage for operating a control member, such as a hydraulic valve, in two directions.

BACKGROUND OF THE INVENTION

In an effort to increase the functionality and versatility of the present material handling equipment, many added features and options have become available. While offering a full range of options has found considerable commercial success, the control linkages for such options sometimes require an excessive operating throw of the control lever from the neutral position. Because it is desirable to avoid undue cluttering of the operator's area in material handling equipment and unnecessary waste of limited control panel space, providing control devices which are compact and easily operated is particularly important. Controls which are responsive to operator input and which do not require excessive manipulation by the operator enhance the efficiency of work operations, and are less fatiguing for the operator.

Numerous control linkages have been employed for controlling independent functions of material handling equipment. Typically, these control linkages incorporate a single control lever movable in forward and rearward linear directions from a neutral position. This type of two-position selective movement from a neutral position is desirable for operating many of the reversibly operable mechanisms associated with material handling equipment, such as loader buckets, crawler or wheel drives, and the like. However, forward and rearward linear lever movement from a neutral position frequently requires a relatively large amount of room to provide sufficient lever throw for easily controlling the operating lever of such a linkage.

Thus, in view of the shortcomings of control linkages heretofore known in overcoming problems of limited control panel space, it is desirable to provide a control linkage assembly having an operating lever selectively movable from a neutral position along one of two paths of travel each of which extend in the same general direction from the neutral position for providing dual state or reversible control of the different operating mechanisms associated with material handling equipment.

SUMMARY OF THE INVENTION

The subject invention provides a simple and efficient control linkage through which a control member, such as a hydraulic valve or the like, may be selectively actuated by movement of a single operating lever in one of two operating directions extending generally to the same side of a neutral position. Thus, the disadvantages of control linkages requiring throw room for the operating lever in opposite directions from a neutral position are eliminated by movement of the operating lever to generally only one side of the neutral position. This desirably minimizes the amount of cab control panel space required for full operating lever movement. This is a particularly desirable feature of the present invention when it is used in conjunction with a relatively small material handling implement, such as a so-called skid steer loader, where control panel space is limited. The present control linkage can be employed for controlling the hydrostatic transmission commonly used in propelling this type of material handling equipment, and is readily adapted for controlling other reversible or two-way operating functions.

In the illustrated embodiments of the present invention, the present control linkage is provided for controlling the direction and speed of a hydrostatic transmission system in a material handling implement. The linkage includes an operating lever which is pivotal about first and second generally horizontal axes which are generally perpendicular to each other. Notably, movement of the operating lever is preferably guided by a generally V-shaped channel defined by a lever housing. The operating lever is selectively movable for engagement with one of two engaging levers within the housing. After engagement with one of the two engaging levers, movement of the operating lever provides movement of the respective one of engaging levers as the operating lever is moved in one of the two operating directions.

Movement of the operating lever in a first operating direction allows a reversibly movable element of a control member, such as a hydraulic valve, to be moved in a first operating direction by engagement of the operating lever with a first one of the engaging levers. Similarly, movement of the operating lever in a second operating direction allows the movable element of the control member to be moved toward a second operating position by cooperation of the operating lever with the other, second one of the engaging levers. Such operation of the control member is provided through use of connecting links operatively connecting the engaging levers with a control link through an intermediate shaft.

As noted, the lever housing preferably defines a generally V-shaped channel delineating two separate paths that may be traversed from the neutral position by the operating lever for guiding the lever in the first and second operating directions. Both the first and second operating directions eminate and extend from the neutral position point generally in the same direction with respect to the neutral position so that the operating lever is preferably moveable through a generally V-shaped path. As will be appreciated, this is in distinction from previous control devices in which movement of an operating lever is provided in linearly opposite directions from a neutral position. As a result, the present linkage requires relatively little room in the operator control area, and may be easily and precisely manipulated to provide reversible control such as for controlling the direction and speed of a hydrostatic transmission.

Numerous other advantages and features of the present invention will become readily apparent from the following detailed description of the invention and embodiments thereof, from the claims, and from the accompanying drawings.

DESCRIPTION OF THE PREFERRED EMBODIMENTS

Figure 1:
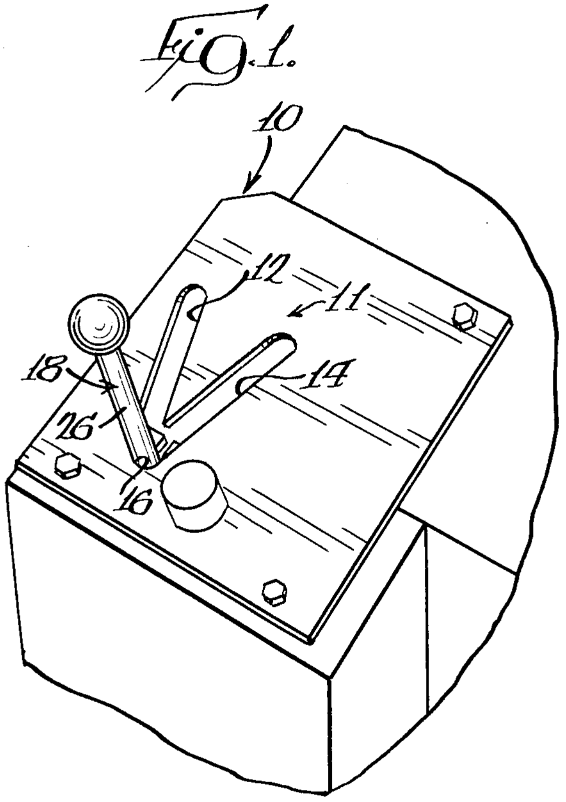
FIG. 1 is a fragmentary perspective view of the control panel of an implement incorporating the present invention, including a lever housing defining first and second operating direction paths eminating from a neutral position.

While this invention is susceptible of embodiment in many different forms, there are shown in the drawings and will be described in detail first and second embodiments of the invention. It should be understood, however, that the present disclosure is to be considered as an exemplification of the principles of the invention and is not intended to limit the invention to the embodiments illustrated.

Upon inspection of FIG. 1, it will be seen that a portion of the operator control area of a material handling implement is shown with a lever housing having a control panel 10 illustrated. The control panel 10 preferably defines a generally V-shaped channel 11 which includes lever guide paths 12 and 14 eminating from and on the same general side of a neutral position 16 at the intersection of guide paths 12 and 14. The guide paths 12 and 14 provide the paths for movement of an operating lever 18, which protrudes through the control panel, in first and second operating directions defined by the guide paths. As will be apparent from the following description of the present control linkage, the preferred V-shaped channel defined by control panel 10 could alternatively be generally U-shaped, and is preferably provided to guide the movement of operating lever 18 in its first and second operating directions.

According to the present invention, a single control unit or linkage is incorporated into a material handling implement for controlling a dual state function associated with the implement. The control linkage includes the single operating lever 18 which is pivotally mounted for movement about a first axis about an operating shaft 20. In this embodiment, the operating lever 18 includes a first, preferably tubular portion 24 through which extends the operating shaft 20 for movement of the lever about its first pivoting axis, and a second, handle portion 26 with an upper free end disposed above control panel 10. The second portion 26 is pivotal about a pin 28 about a second pivotal axis which is generally at a right angle to the first axis defined by operating shaft 20. The operating lever 18 is preferably urged toward a center position with respect to the second pivoting axis by biasing means, such as a coil spring 30, that is operably disposed between first portion 24 and second portion 26 of lever 18 at pin 28. This preferred construction facilitates the centering of second portion 26 of operating lever 18 while positioned in the neutral position.

Figure 2:
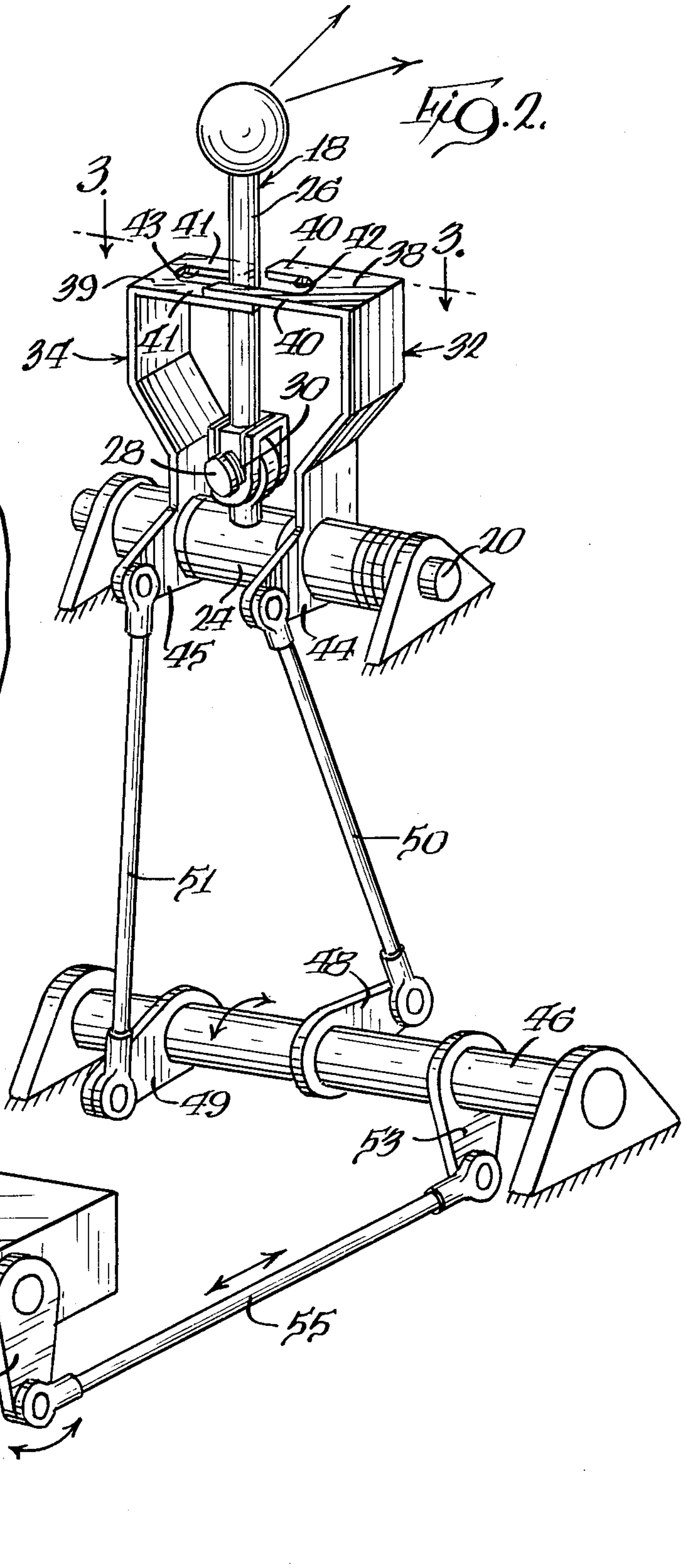
FIG. 2 is a diagrammatic perspective view of the present control linkage.

In the first illustrated embodiment of the present invention shown in FIG. 2, the operating lever 18 is mounted on operating shaft 20 between first and second engaging levers 32 and 34. The engaging levers 32 and 34 are each mounted for rotation about the first pivotal axis defined by operating shaft 20. The engaging levers 32 and 34 are adapted to be selectively engaged by handle portion 26 of operating lever 18. The engaging levers 32 and 34 respectively include a forked upper portion 38, 39, with flanges 40, 41 defining recesses or slots 42, 43 for receiving handle portion 26 of operating lever 18. The engaging levers 32 and 34 further respectively include arms 44, 45, which in combination with the forked upper portions of the engaging levers provide each engaging lever with the general configuration of a bell crank, allowing motion imparted to the forked upper portions of the levers to be transferred to the arms 44, 45.

The control linkage of the present invention further includes a rotatable intermediate shaft 46, with a pair of arms 48, 49 extending from and mounted to the shaft. The intermediate shaft 46 is rotatable about an intermediate axis which is spaced from the first operating axis of operating shaft 20. The arms 48, 49 are rotatable with the shaft about the intermediate axis. First and second connecting links 50, 51 operatively connect arms 44, 45 of first and second engaging levers 32 and 34 with arms 48, 49 mounted to intermediate shaft 46. An arm 53 is also affixed to intermediate shaft 46, with arm 53 operatively connected with a control member, designated 54, by a control link 55. Control member 54 may comprise a reversibly operable hydraulic valve or like device which includes a control element 56 movable in first and second opposite directions from a centrally disposed neutral position. The control member 54 may comprise the control device for a hydrostatic transmission, with movement of control element 56 from its neutral position determining the speed and direction of the transmission drive.

Figure 3:
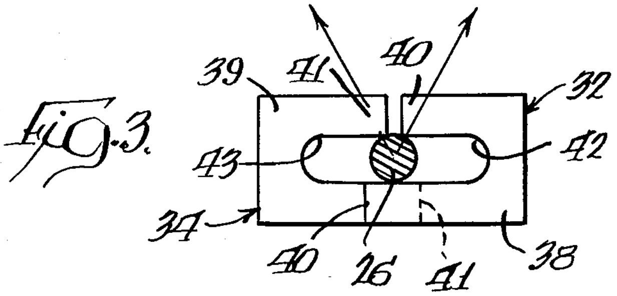
FIG. 3 is a view taken generally along lines 3—3 of FIG. 2.

The operation of the control linkage assembly will now be described with reference to FIGS. 3 and 4. Generally stated, the second or handle portion 26 of operating lever 18 is pivoted about its second axis defined by pin 28 such that it is received by one of the recesses or slots 42, 43 respectively defined by the first and second engaging levers 32 and 34. As will be appreciated, movement of the handle portion 26 in this manner occurs attendant to manipulation of portion 26 by the operator in one of the two operating directions defined by paths 12 and 14 of channel 11 from the neutral position 16.

Notably, the preferred configuration of forked portions 38 and 39 of engaging levers 32 and 34 facilitates selective operative engagement of handle portion 26 of lever 18 with one of engaging levers 32 and 34 with little or no distinct transverse movement of the handle portion 26 by the operator. As shown in FIG. 3, in which the arrows illustrate the directions of movement of handle portion 26 of operating lever 18, sufficient clearance or spacing is preferably provided between respective ones of the flanges 40 and 41 of the forked positions 38 and 39 on one side of portion 26 to permit generally linear movement of handle portion 26 as it is guided by channel 11 in either of its first or second operating directions from its neutral position. In order to facilitate realignment of operating lever 18 with engaging levers 32 and 34 as the operating lever is returned to its neutral position, respective ones of flanges 40 and 41 on the other side of handle portion 26 are preferably configured to be in overlapping relation when operating lever 18 is in its neutral position.

Upon movement of operating lever 18 in one of the first or second operating direction, engaging lever 32 or 34 will begin to pivot about the first axis defined by operating shaft 20 with operating lever 18. It should be noted that when movement in either operating direction is initiated, the operating lever along with the selected engaging lever will be pivoting in the same direction about the operating axis of shaft 20. This pivotal movement will impart motion to one of the arms 44, 45 associated with the first and second engaging levers, causing one of connecting links 50, 51 to impart rotation to the intermediate shaft 46 in one of two opposite directions through one of arms 48, 49 mounted thereto.

Figure 4:
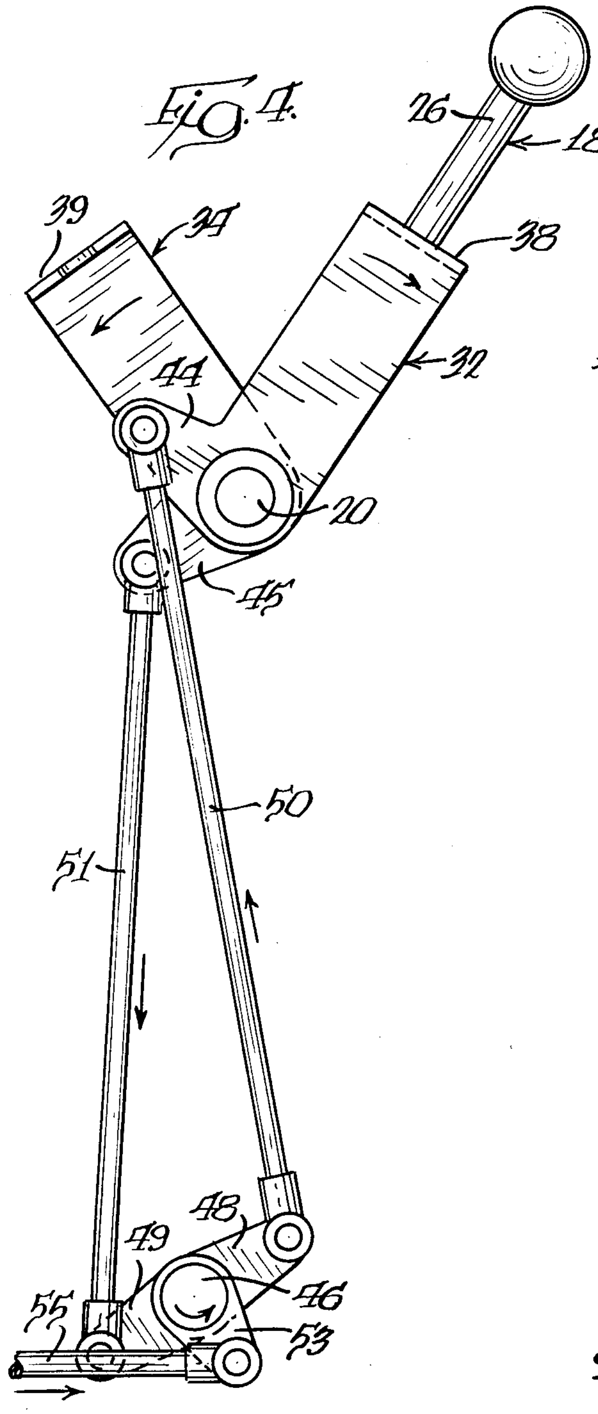
FIG. 4 is a diagrammatic side elevational view illustrating operation of the present control linkage.

Referring specifically to FIG. 4, operation of handle portion 26 of operating lever 18 in its first operating direction is illustrated. Movement of handle portion 26 by the operator is preferably guided by the channel 11 in the control panel 10 (FIG. 1) so that the handle portion is received within slot 42 of engaging lever 32 as the lever 32 is pivoted in unison with the operating lever 18. It will be noted that as first engaging lever 32 is moved by operating lever 18, second engaging lever 34 pivots in an opposite direction about shaft 20. Movement of engaging lever 32 about the axis defined by operating shaft 20 acts through link 50 to rotate intermediate shaft 46, thus resulting in movement of control link 55 in a first direction.

Figure 5:
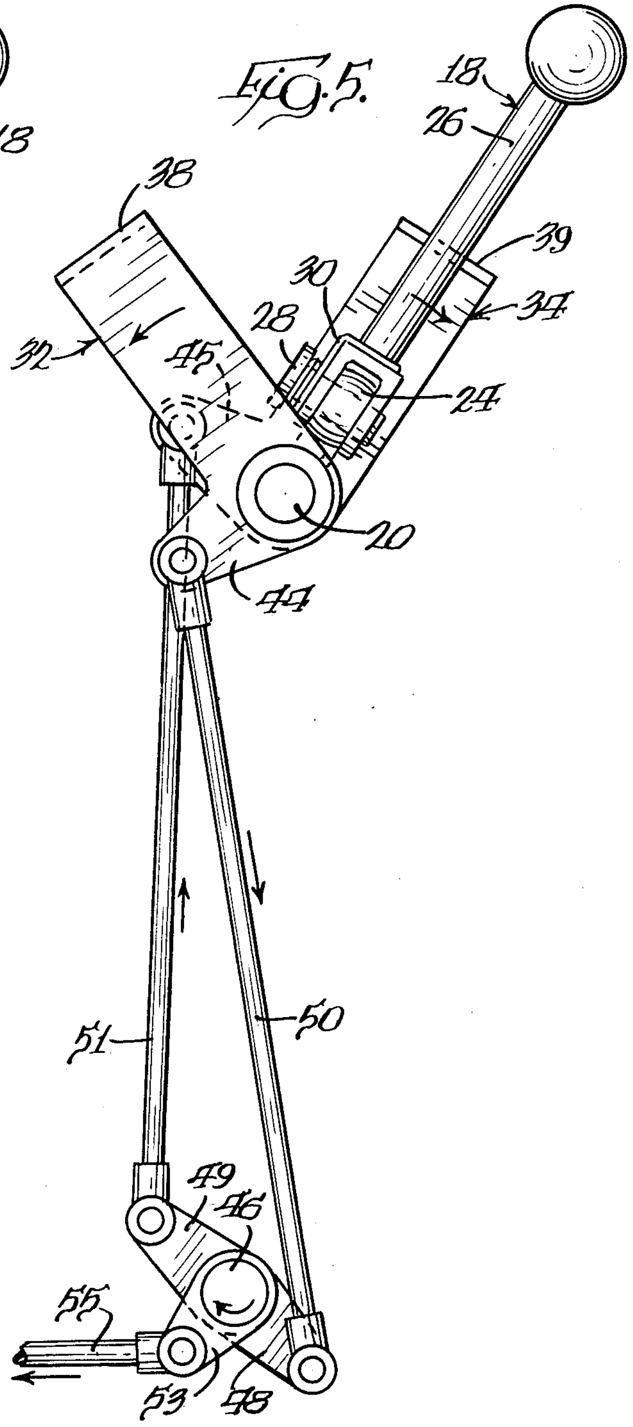
FIG. 5 is a view similar to FIG. 4 further illustrating operation of the present control linkage.

Similarly, FIG. 5 illustrates movement of handle portion 26 in its second operating direction such that it is received within slot 43 of second engaging lever 34 for pivoting the lever 34 therewith (with first engaging lever 32 pivoting in an opposite direction.) Movement of link 51 by engaging lever 34 rotates intermediate shaft 46 so that control link 55 is moved in an opposite direction.

As can be seen from the figures illustrated, arms 48 and 49 on shaft 46 are disposed on respective opposite sides of an imaginary plane extending through the rotational axis of the intermediate shaft 46 and the pivotal connection of arm 53 with control link 55. This relative positioning effects the movement of the control element 56 associated with control member 55 toward its first and second control positions from a neutral position. Mounting of arms 48 and 49 on either side of the imaginary plane facilitates opposite rotations of intermediate shaft 46 about its axis in response to movement of engaging levers 32 and 34 by handle portion 26 of lever 18. Since intermediate shaft 46 is rotating in a first direction upon actuation of the first engaging lever 32 by handle portion 26, and in a second direction upon movement of engaging lever 34 by handle portion 26, control element 56 is movable in opposite directions from its neutral position toward two distinct control positions through control link 55.

As noted, movement of one of the engaging levers 32 or 34 in its control direction by handle portion 26 results in pivotal movement of the other engaging lever in the opposite direction about operating shaft 20. This occurs since no lost motion device is incorporated in the present embodiment of the control linkage assembly, and results from the rotation of intermediate shaft 46 acting through the link connecting the shaft with the non-engaged one of the levers 32 and 34. However, it will be understood that a suitable lost motion device could be readily incorporated into the present invention, and may be desirable for certain applications.

Figure 6:
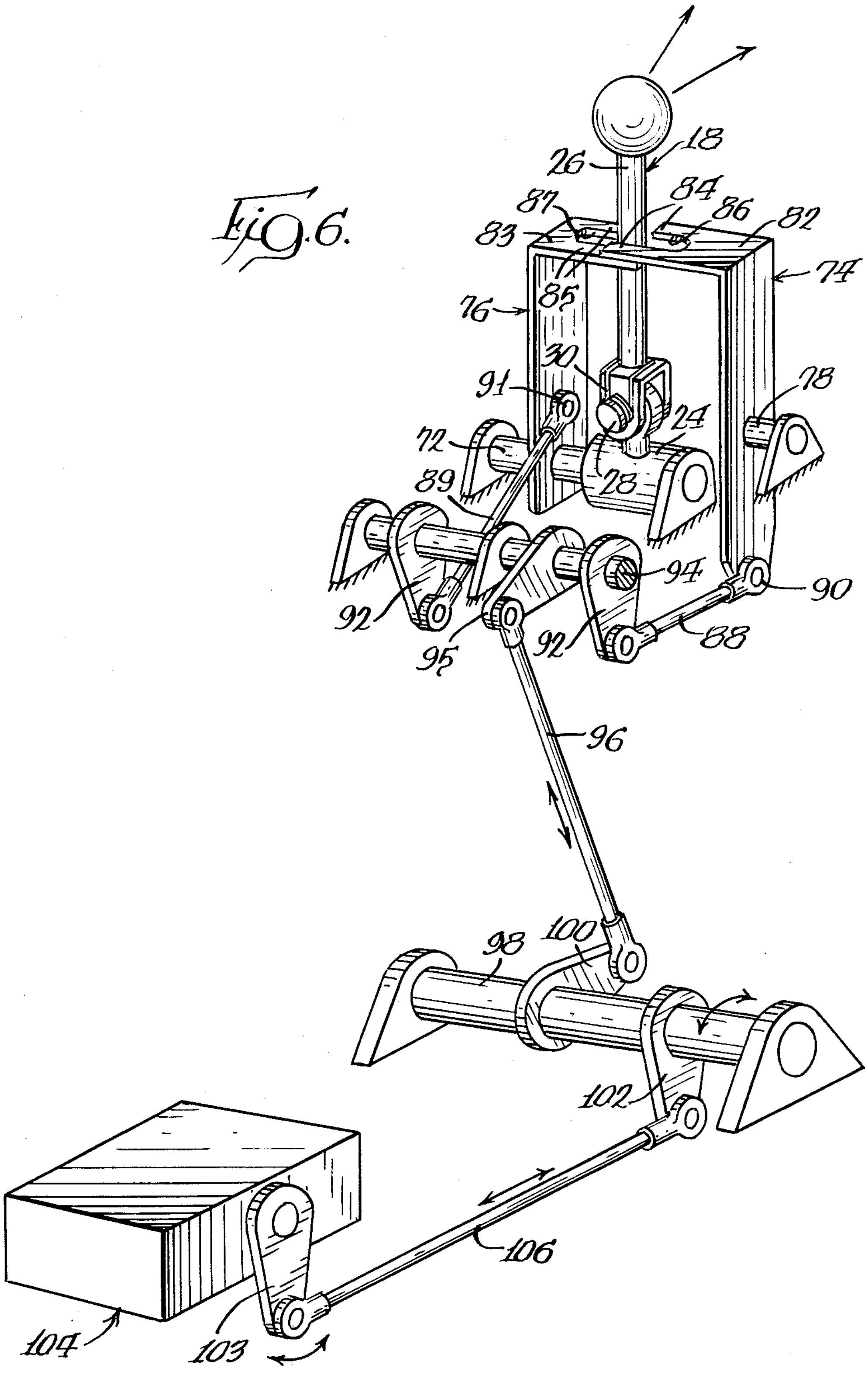
FIG. 6 is a perspective diagrammatic view of an alternate embodiment of the present control linkage.

FIG. 6 illustrates an alternate embodiment of the present invention that is also preferably used in conjunction with lever guide paths 12 and 14 defined by channel 11 of control panel 10 illustrated in FIG. 1. This alternate embodiment includes an operating lever 18 configured similarly to the operating lever 18 of the above described embodiment, including a first portion 24 pivotally mounted to an operating shaft 72 for movement about a first axis, and a second, handle portion 26 having an upper free end portion which is pivoted at pin 28 to portion 24 so that the handle portion 26 is pivotal about a second axis generally at right angles to the first axis defined by operating shaft 72. A coil spring 30 is preferably operably disposed between the first and second portions 24 and 26 at pin 28. Handle portion is adapted to extend through channel 11 defined by control panel 10 (FIG. 1) for manipulation by the operation in either one of two operating directions as defined by guide paths 12 and 14.

The alternate embodiment includes first and second engaging levers 74 and 76, lever 74 being pivotal about a first fulcrum 78, and lever 76 being pivotal about a second fulcrum defined by operating shaft 72. Each engaging lever includes a forked upper portion 82, 83, with flanges 84, 85 defining recesses or slots 86, 87. Each recess or slot is adapted to receive the handle portion 26 of the operating lever 18 when the handle portion is pivoted about pin 28. Notably, forked portions 82 and 83 are preferably configured similarly to the forked portions 38 and 39 of the engaging levers 32 and 34 in the previously described embodiment.

Engaging levers 74 and 76 are respectively operatively connected with first and second connected links 88, 89 at pins 90, 91. The connecting links 88, 89 are further operatively connected with a pair of arms 92 affixed to a rotatably mounted shaft 94 spaced from operating shaft 72. This arrangement allows the motion imparted to one of the engaging levers 74 and 76 by handle portion 26 to be transferred through one of the arms 92 to rotate shaft 94. To facilitate movement of the shaft 94 in the two directions necessary to provide two directional control, the connecting link 88 associated with engaging lever 74 is connected to that lever on the side of its fulcrum 78 opposite from its forked portion 82. In distinction, connecting link 89 is connected to engaging lever 76 on the same side of its fulcrum (at shaft 72) as its forked portion 83. It will thus be appreciated that even though handle portion 26 of operating lever 18 acts to move forked portions 82 and 83 in the same general direction as the handle portion is moved in either one of its operating directions, shaft 94 will rotate either clockwise or counterclockwise depending upon which of engaging levers 74 and 76 is operatively engaged by the handle portion 26.

Selective opposite rotation of shaft 94 is transmitted therefrom by a connecting rod 96 operatively connected with shaft 94 by an arm 95. Movement of the connecting rod 96 imparts movement to an intermediate shaft 98 through a pivotal connection to an arm 100 mounted to the intermediate shaft 98. Rotation of the intermediate shaft 98 imparts movement to another arm 102 also mounted to the shaft. It should be noted that the intermediate shaft 98 with its associated arms 100 and 102 generally forms a bell crank so that motion imparted to one of the arms is transferred to the other arm through the intermediate shaft 98. The motion transferred through the intermediate shaft 98 is transferred to a control element 103 associated with a control member 104, such as a hydraulic valve. Through a control link 106. This allows the selective positioning of control element 103 in distinct first and second opposite directions from a neutral position.

The operation of the alternate illustrated embodiment is substantially similar to that of the first illustrated embodiment as herein described above. Handle portion 26 of operating lever 18 can be selectively engaged with either of engaging levers 74 and 76 attendant to movement in either of first or second operating directions, with guided movement of the operating handle preferably provided by a V-shaped channel such as illustrated in FIG. 1.

When the handle portion 26 of lever 18 is moved in the first operating direction, its operative engagement with engaging lever 74 acts through link 88 to impart rotation to shaft 94. The rotation of shaft 94 operates through link 96, intermediate shaft 98, and control link 106 to move control element 103 in a first direction from its neutral position. Similarly, when handle portion 26 of lever 18 is moved in its second operating direction for movement of engaging lever 76 therewith, lever 76 acts through link 89 to rotate shaft 94 in an opposite direction. The opposite rotation of shaft 94 moves link 96, shaft 98 and control link 106 in opposite directions to move control element 103 in a second direction from its neutral position.

Thus, the subject invention provides a control linkage assembly comprising an operating lever that is movable from a neutral position in one of two operating directions which extend generally in the same direction from the neutral position of the lever for selectively actuating a control member in one of two opposite control directions. Movement of the operating lever in generally the same direction from a neutral position facilitates convenient and precise control by an operator, and desirably reduces the amount of space required for the controls on the control panel of a material handling implement when compared with conventional control lever arrangements.

It should be understood that the control linkage of the present invention is described embodied with a hydraulic control member associated with a hydrostatic transmission, but such a device could effectively be used in a variety of other applications.

From the foregoing, it will be appreciated that numerous variations and modifications may be effected without departing from the true spirit and scope of the novel concept of the subject invention. It will be understood that no limitation with respect to the specific apparatus illustrated herein is intended or should be inferred. It is, however, intended to cover by the appended claims all such modifications as fall within the scope of the claims.

What is claimed is:

1. An operating linkage for operating a control element of a hydraulic control member in first and second opposite directions, comprising:

a pivotally mounted operating lever moveable through a generally V-shaped path from a neutral position in first and second operating directions through pivotal movement of said lever about first and second pivotal axes; and first and second pivotally mounted lever means comprising forked portions adapted to cooperate with said operating lever, whereby movement of said operating lever from the neutral position in said first operating direction operatively engages said first lever means for movement of said control element in said first direction, and movement of said operating lever from the neutral position in said second operating direction operatively engages said second lever means for movement of said control element in said second direction.

2. The hydraulic control member operating linkage of claim 1, wherein said operating lever includes self-centering means to facilitate positioning of the operating lever in a center position with respect to said second pivoting axis when the operating lever is positioned in said neutral position.

3. The control member operating linkage of claim 1, further comprising a shaft for pivotally supporting each of said first and second lever means and said operating lever for movement about said first axis;

an intermediate shaft mounted for rotation about an axis spaced from the first axis operatively connected with said control element by control link means pivotally connected with said intermediate shaft; and first and second links respectively pivotally connected to said first and second lever means and with said intermediate shaft, the pivotal connection of said first and second links being disposed on opposite sides of a plane extending through the pivotal connection of said control link means to said intermediate shaft and the axis of the intermediate shaft to provide opposite rotation of the intermediate shaft attendant to respective movement of said control element in said first and second directions.

4. The hydraulic control member operating linkage of claim 1, further comprising shaft means mounted for rotation about an axis spaced from said first axis, and connecting means for operatively connecting said shaft means with said control member;

said first and second lever means being respectively mounted for pivotal movement about first and second fulcrums;

a first link operatively connected with said shaft means, and with said first lever means on the side of said first fulcrum opposite the portion of the first lever means adapted for engagement by said operating lever; and a second link operatively connected with said shaft means, and with said second lever means on the same side of said second fulcrum as the portion of the second lever means adapted for engagement by said operating lever;

whereby said shaft means is rotatable in a first direction attendant to movement of said first lever means by said operating lever when said operating lever is moved in said first operating direction to move said control element in said first direction, said shaft means being rotatable in an opposite direction attendant to movement of said second lever means by said operating lever when said operating lever is moved in said second operating direction to move said control element in said second direction.

5. The hydraulic control member operating linkage of claim 4, wherein said connecting means comprises an intermediate shaft operatively connected to said shaft means through a connecting link, said intermediate shaft being operatively connected with said hydraulic control member by control link means.

6. The hydraulic control member operating linkage of claim 1, wherein said forked portions of said first and second lever means each include a pair of flanges, said flanges being configured such that when said operating lever is in its neutral position, one flange of each pair is spaced from the respective flange of the other pair, and the other flange of each pair is in overlapping relation with the respective flange of the other pair.

* * * * *